Figure 1:
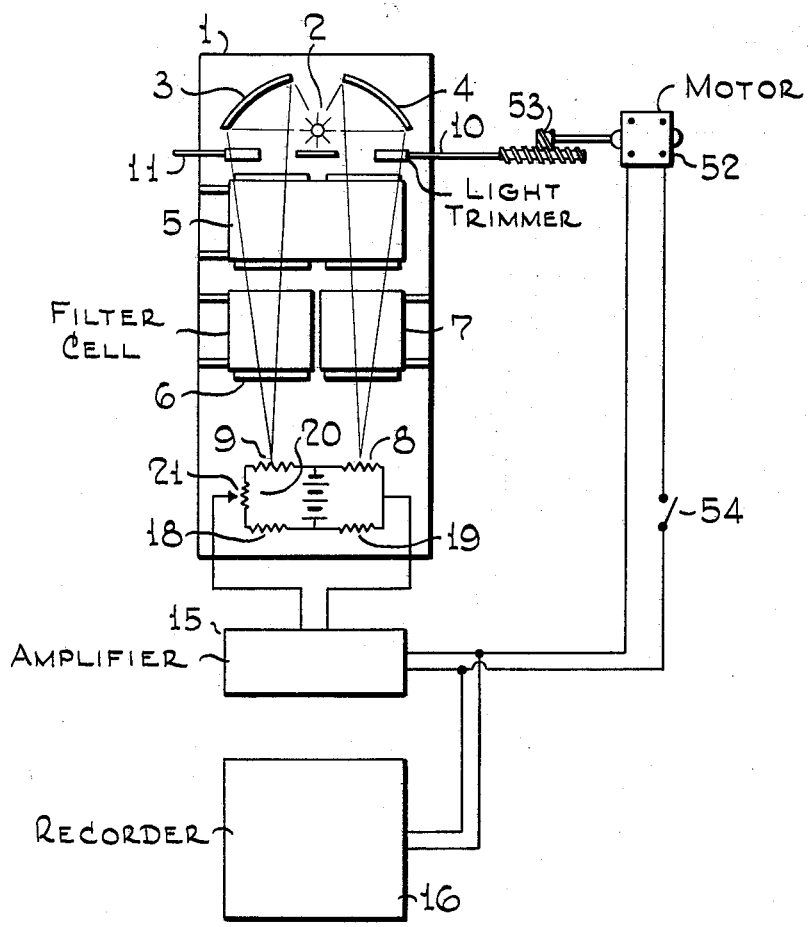

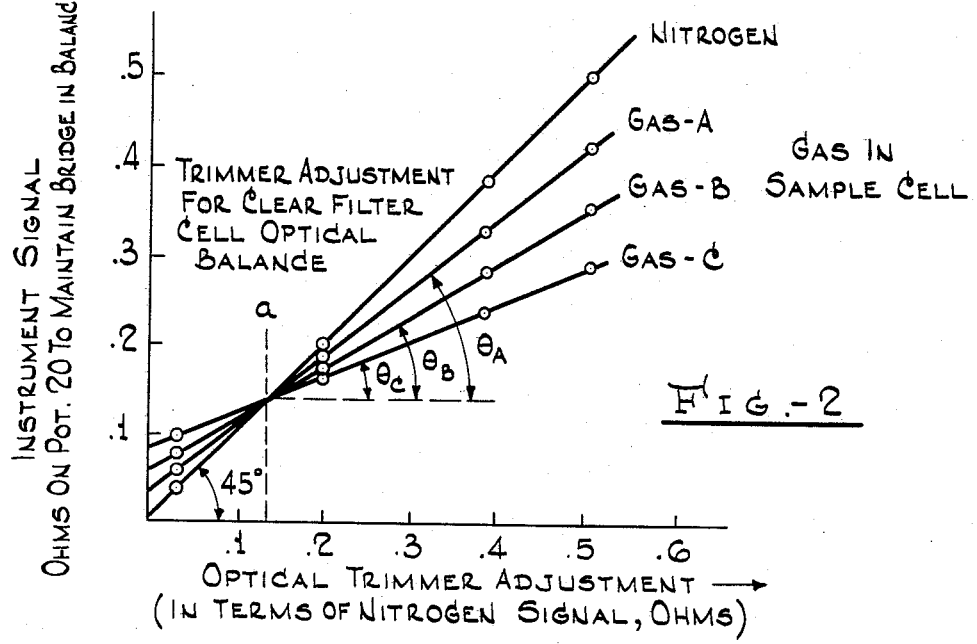
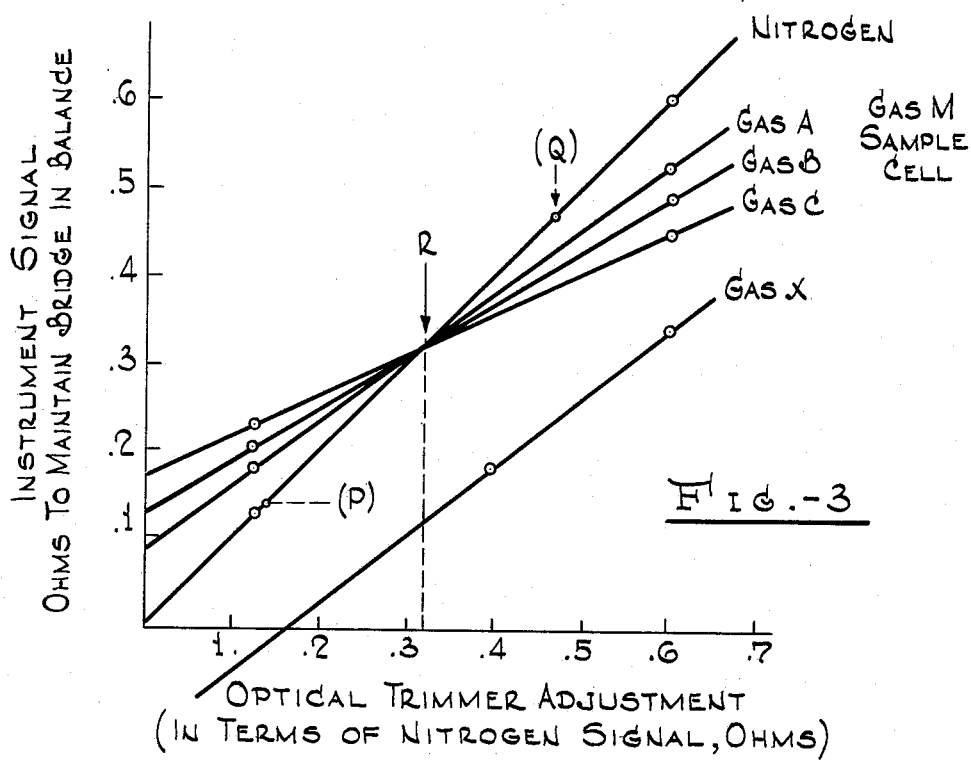

United States Patent Office 2,718,597
Patented Sept. 20, 1955

2,718,597
INFRARED ANALYSIS APPARATUS

John J. Heigl, Cranford, and John A. Hinlicky, Irvington, N. J., assignors to Esso Research and Engineering Company, a corporation of Delaware Application November 1, 1951, Serial No. 254,412

7 Claims. (Cl. 250—43.5)

This invention concerns a novel infrared analysis apparatus. The apparatus is particularly intended for use as a continuous analyzer in process control applications. In this use the instrument is particularly characterized by the manner in which periodic restandardization of the instrument is simply and effectively conducted either manually or automatically. Thus, by virtue of this invention, an infrared analytical apparatus is provided capable of prolonged continuous service in control applications, while maintaining a high degree of accuracy as a result of the frequent and convenient standardization provided.

In recent years it has been found that infrared analysis techniques may be usefully applied to the analysis of a wide variety of complicated liquid or gas mixtures. For example, techniques are now known for adapting the principles of selective infrared absorption to analyze for any desired infrared absorbing constituent in a mixture, even though some or all of the remaining constituents of the mixture absorb infrared energy. An example of this application is the analysis of hydrocarbon mixtures of the nature encountered in petroleum refining operations. Relatively complicated mixtures of petroleum hydrocarbons, each of which absorbs infrared radiation may be successfully analyzed by infrared techniques.

The apparatus and technique required for this purpose is disclosed in U. S. application, No. 31,346, filed June 5, 1948, by Charles W. Skarstrom which matured on December 21, 1954, as U. S. Patent 2,697,789. As there disclosed, successful analytical results for the determination of one component in a mixture of infrared absorbing constituents may be conducted by employing a dual beam infrared analytical instrument. In this instrument one of two beams of infrared energy is passed through a sample cell and through a "filter cell" to impinge on a radiation detector. The other of the two beams of radiation is passed through the same sample cell and through a "compensator cell" to impinge on a second radiation detector. By placing constituents in the "filter" and "compensator" cells which are particularly selected in regard to their radiation absorbing characteristics, and by critically adjusting the intensity of the radiation in the two beams referred to, independently of absorption occurring on passage through the cells, it is possible to "sensitize" the instrument for the detection of a desired constituent. Variations in the proportion of this constituent in mixtures admitted to the sample cell will then cause a differential voltage to be developed by the two detectors proportional to the concentration of this constituent. It is a critical feature of this analysis system that in order to critically control the intensity of the radiation in the two beams as indicated, an opaque shutter or "light trimmer" is positioned in one or both of the beams of radiation so as to effect the relative quantity of radiation in the two beams. In essence the shutter or light trimmer is employed to critically unbalance the amount of radiation in the two beams of energy. Selective and sensitive analytical results are possible by this general technique so long as the intentional unbalance in radiation between the two beams is maintained at the proper fixed value.

It has been found that in practical applications of this analytical apparatus and technique difficulties are encountered. Thus in adapting the infrared analysis technique described to application in a petroleum refinery, it is generally necessary to place the instrument in an explosion-proof housing which must be thermostated to maintain a fixed temperature. As a result, the instrument is relatively inaccessible and restandardization becomes difficult and prolonged. Opening of the explosion-proof housing for restandardization upsets the thermostating arrangement so that restandardization is complicated due to the uncertain effect of differing temperatures then existing. Again, there are certain hazards in exposing the parts within the explosion-proof case to the explosive atmosphere in the refinery. On re-closing the casing, a relatively long period of time is required for the instrument to return to the proper operational temperature. The problem of restandardizing an infrared analyzer of the character referred to is further complicated by the requirements of the analysis technique. As stated, a particular and fixed unbalance in radiation intensity of the two beams employed must be maintained so that any effect caused by non-uniform fogging of cell windows, accumulation of dust, changes of reflectivity of mirrors, changes in filament alignment, etc. must be overcome by periodic restandardization. It should be observed that this restandardization can only be achieved by a critical re-setting of the light trimmers. It is not possible, for example, in the analysis technique referred to, to suitably compensate for any of the above factors by rebalancing of bridge networks associated with the two detectors or by other such methods.

In accordance with this invention therefore, means are provided for re-establishing the critical setting of light trimmers associated with a dual beam infrared analysis instrument. The apparatus employed for restandardization simply comprises a motor driven trimmer control adapted to automatically re-set the critical trimmer adjustment when periodically actuated so as to overcome the effects of dust accumulation, changes in filament alignment, etc.

Figure 4:
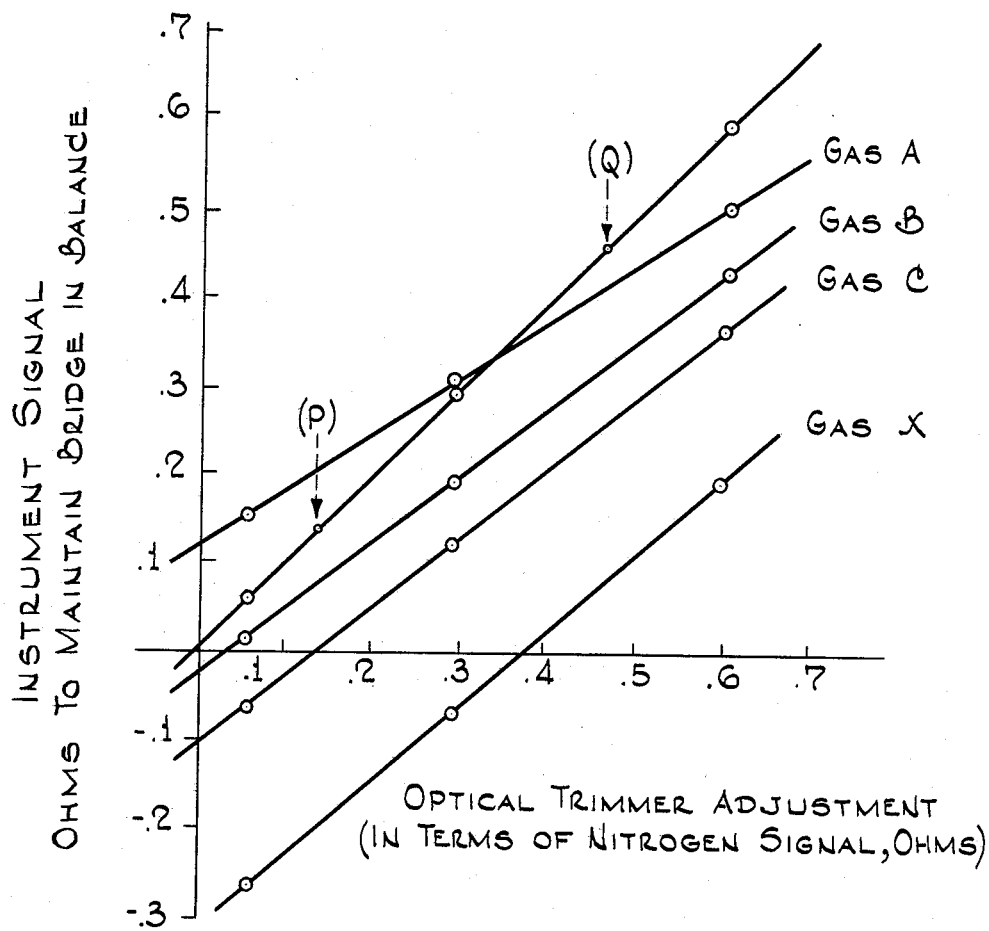

The objectives, nature, and features of this invention will be identified in the following description by reference to the accompanying drawings in which:

Figure 1 diagrammatically illustrates a preferred embodiment of the invention including the automatic standardization components;

Figure 2 diagrammatically illustrates the instrument response pattern generally obtained under varying conditions of unbalance of the beams of radiation employed in the apparatus of Figure 1;

Figure 3 illustrates the response pattern of the instrument containing the gases of Figure 2 when the instrument has been suitably sensitized for analysis results; and Figure 4 shows this same response pattern as effected by changes in the critical balance of radiation in the two beams.

Referring now to Figure 1, it will be noted that the analyzer comprises a housing 1 in which the optical equipment and gas cells are placed. A light source 2 capable of emitting infrared radiation is placed at one end of the analyzer. To each side and behind the light source are placed concave mirrors 3 and 4 which serve to direct the light from source 2 along the paths indicated. Light from the mirrors 3 and 4 is transmitted along separate paths through a sample cell 5 and then through either a filter cell 6 or a compensator cell 7, to impinge on resistance thermometers 8 and 9. The apparatus is so arranged that both beams of light pass through the sample cell 5 while one beam passes through the filter cell 6 and the other beam passes through compensator cell 7. The cells are each provided with openings to permit introduction and withdrawal of fluids. "Trimmers" 10 and 11 are provided in the light paths adjacent to the mirrors. These trimmers are adapted to change the amount of radiation passing them and reaching the sample cell. The trimmers, for example, may be opaque plates constructed so as to permit screwing them into or out of the path of the light so as to permit more or less radiation to pass and to reach the radiation detectors 8 and 9. Any type of radiation measuring device may be used with the apparatus of Figure 1, of the character providing a voltage proportional to the energy impingement thereon. For example, resistance thermometers, bolometers, or thermopile detectors may be used. It is preferable to connect the two radiation detecting elements 8 and 9 in opposition in order to determine the differential output of the two detectors by connecting the radiation detecting elements 8 and 9 in a bridge network consisting of the resistance elements 18, 19, and potentiometer 20, having a movable contact 21. The condition of electrical balance or unbalance of this bridge network is amplified and recorded by the amplifier 15 and recorder 16 of conventional nature.

In employing the analytical apparatus of Figure 1 according to the technique to which this invention has application, it is necessary to place certain constituents in the filter and compensator cells 6 and 7. In order to determine the constituents to be included in the filter and compensating cells, a particular procedure must be followed. To understand this procedure, first let it be assumed that both cells 6 and 7 are filled with nitrogen or some other gas transparent to infrared radiation. If nitrogen gas is also placed in the sample cell 5, the adjustment of either of the optical trimmers 10 or 11 will result in a change of the signal output recorded on the recorder 16. If, for example, the trimmer 10 is moved so as to cast more shadow on the compensator cell 7, then the total energy detected by detector 8 will be decreased. Consequently, there will be a change in the signal output of the detector bridge and a voltage difference will be recorded by recorder 16. The unbalance of the detector bridge may, of course, be brought back to a balanced condition by a corresponding adjustment of the trimmer 11 or by adjusting the bridge balancing potentiometer.

If now, in addition to nitrogen, various other gases which absorb infrared radiation are passed successively through the sample cell at atmospheric pressure, and measurements are made of the detector bridge signal for a variety of positions of the optical trimmer 10, the resulting data when plotted will resemble Figure 2. In Figure 2 the signals obtained for the different gases are plotted for each fixed trimmer position. The trimmer position is measured by the value of the nitrogen signal. Thus the line for nitrogen is at 45 degrees in Figure 2, while the lines for the other gases A, B and C, are at lesser angles.

The tangents of the angle of each line ($\tan \theta_A$, etc.) measure the fraction of the total radiation transmitted by the gas in the spectral region defined by the emitted spectrum of the source which is bounded and weighted in accordance with the transmission characteristics of the cell windows. The fraction of this radiation absorbed by the gas is $(1-\tan \theta_A)$, $(1-\tan \theta_B)$, etc. For example, the fraction of total radiation absorbed by certain gases as found with the aid of optical trimmers in combination with the instrument and method described above are listed in the following table:

| Gas at 1 Atmosphere, 128° F., 24 cm. cell | Fraction Absorbed from Radiation of Chromel Filament at 700° F. through Calcium Fluoride Windows |
|---|---|
| Nitrogen | 0.00 |
| Carbon Dioxide | 0.10 |
| Methane | 0.23 |
| Ethane | 0.40 |
| Ethylene | 0.34 |
| Propane | 0.53 |
| Propylene | 0.60 |

Thus it is possible with the aid of the optical trimmers to make measurements of the relative opacities of individual gases and gas mixtures.

Returning to Figure 2, which is designated as a response pattern, it can be observed that the lines for the various gases A, B, C, and nitrogen all cross at the point $a$. This point $a$ is called the "clear cell optical balance point" of the instrument. At the particular trimmer adjustment for point $a$, each of the absorbing gases cause the instrument to respond with the same signal. Thus at this condition of the trimmers, the absorbing gases are indistinguishable from nitrogen as well as from one another. Further, if the pressure of the absorbing gases is increased or reduced from one atmosphere, no change in signal occurs when the trimmers are set for the point $a$.

Now in order to develop selective sensitivity of this instrument to a single gas X in the presence of other gases A, B, and C of a mixture, one of the cells 6 or 7, say cell 6, is filled with gas X, thereby sensitizing the instrument to gas X. Upon sensitizing the instrument to gas X, the resulting response pattern for relatively non-interfering gases is shown in Figure 3 as typical.

It will be found that the clear cell balance point has moved from point P to point Q. A readjustment of the optical trimmers is now necessary in order to operate at the desirable point R as illustrated. At this point R, the gases A, B, and C, are indistinguishable from nitrogen as well as from one another and at the same point R an appreciable signal is obtained for gas X. Use of the optical trimmers for continuously maintaining operation at the desirable point R in Figure 3 is a particular feature of this invention.

The desirable operating point R is found for each instrument and for each analysis through the use of the optical trimmers. The various gases contained in a mixture to be analyzed are passed individually through the sample cell of the sensitized instrument. This is done at different optical trimmer settings until one particular setting is found at which the instrument response to all gases in the mixture but the one desired are identical. This procedure is carried out by setting the trimmers in at least two different positions for each gas until a plot such as Figure 3 may be drawn. This will establish the trimmer setting which will correspond to point R. This trimmer setting is then retained for the desired analysis. Calibration for various proportions of gas X in gases A, B, and C, establishes a graduated scale of instrument signal against partial pressure or percentage of gas X in the mixture.

In cases where the gases of a mixture have similar absorption spectra, such as hydrocarbon gases of the same series, it is not possible to locate a point or region of minimum interference (point R, Figure 3) by adjustment of the optical trimmers alone. The response pattern for such a case resembles Figure 4. Here the instrument is sensitized to gas X by filling the filter cell 6 with gas X. In the response pattern of Figure 4 gases B and C give signals as if they were partially like gas X. No trimmer adjustment can be found where good selectivity to gas X exists. However, by placing a suitable proportion of gases B and C, under a suitable pressure in cell 7, the response patterns of Figure 4 may be altered or compensated to that of Figure 3. Use of the optical trimmers in the same manner as described is again necessary to locate and maintain the operating condition of the instrument at the point or region of minimum interference.

The procedure used to determine the gas composition to be included in the compensator cell 7 involves the following steps: First a pure constituent, other than X, of the mixture being analyzed is placed in cell 7. In general, an infrared opaque gase of the mixture should be tried first. A response pattern is then obtained as described. The pressure of the gas in cell 7 may also be varied while other response patterns are obtained. In the event these steps do not result in a response pattern in which a "clear cell optical balance point" can be located, it is necessary to repeat the procedure after adding another gas or gases to the cell 7. It is sometimes necessary to employ a gas in cell 7 not present in the gas mixture being analyzed, in order to obtain a response pattern in which a "clear cell optical balance point" is located. Saturated paraffin gases such as propane or butane have been used successfully. By following this procedure it is possible to find a gas composition to be placed in cell 7 which will change the response pattern from that of Figure 4 to that of Figure 3. In other words, it is possible to determine a gas composition which when interposed in one of the beams of the apparatus will result in a non-interfering response pattern, i. e., one which contains a "clear cell optical balance point." The composition may consist of one or more gases and generally is characterized by a gas or gases which are relatively opaque to infrared radiation.

As described, therefore, the analytical procedure to be followed in selectively determining one infrared absorbing constituent in a mixture of infrared absorbing constituents requires a critical unbalance in intensity of radiation in the two beams of the apparatus referred to. This critical unbalance must be determined by employing opaque blocking means or light trimmers in one or both beams of radiation. It is apparent that in this system in the event the intensity of radiation in the two beams is varied after the crtical setting of the light trimmers, error will result, minimizing the selectivity and sensitivity of the instrument to the analysis of the required constituent. This may be considered as moving the trimmer setting from point R of Figure 3 to point P or Q of Figure 3. Factors which in time can cause this undesired variation in the radiation intensity of the two beams are numerous. For example, cell windows may become fogged or etched or covered with dust so as to affect the balance in radiation. Again, the filament alignment in the light source may alter with time or one of the reflective mirrors may vary in reflectivity. In these and other cases it becomes necessary to restandardize the instrument. Practically, restandardization is required at periods varying from a few hours to one or two days, depending on the stability of the filament, condition of the sample, efficiency of gas filters and other factors.

In accordance with this invention restandardization is carried out by connecting the drive motor 52 to one of the light trimmers 10 through the gear drive 53, as shown in Figure 1. The drive motor 52 comprises a reversible motor which will serve to drive light trimmer 10 inwardly so as to decrease the amount of radiation passing the trimmer or alternatively will drive the trimmer outwardly so as to increase the amount of radiation passing the trimmer. The voltage to drive the motor as required is preferably obtained at the output of the amplifier 15, as for example, by connecting drive motor 52 in parallel with the balancing motor of recorder 16. Alternatively, where proximity permits, the shaft of the balance motor of recorder 15 may be directly coupled to the trimmer drive mechanism.

In restandardizing the instrument in this system, the sample cell is first purged and then filled with nitrogen and the differential signal received by the two detectors is then determined. During this operation, motor 52 is disconnected as by operation of switch 54. Thereafter, the sample cell is purged and then filled with an infrared absorbing gas. The infrared absorbing gas is preferably a gas which is present as a constituent in the sample under analysis. Preferably the particular constituent is chosen as that compound which is most dissimilar to that of nitrogen as illustrated by gas C in the response pattern of Figure 2, for example. With this interfering gas in the sample cell of the instrument, switch 54 is then closed and the differential output of the two detectors is thus available to drive motor 52 so as to alter the position of trimmer 10. Motor 52 will drive trimmer 10 until no differential signal is received. Effectively this causes the trimmer setting to move from point P or Q of Figure 3, towards point R of the response lines illustrated in Figure 3. The direction in which the trimmer is driven by the motor will be determined by which of the two detectors receives the greater energy. However, when once motor 52 has been properly connected, the motor will automatically be driven in the correct direction to properly re-set the trimmer. It will be noted that the effect of driving the trimmer in this manner is to correct the unbalance of the radiation beams so that this unbalance will approach the condition originally set up. On analysis, it may be determined that driving the trimmer with motor 52 in the manner indicated will not accomplish complete correction in a single step. It is necessary that the indicated sequence be repeated once or twice to acomplish complete restandardization. Thus the sample cell is again filled with nitrogen and the response to the instrument determined while motor 52 is disconnected. Thereafter the interfering gas is again placed in the sample cell and response determined while motor 52 is connected, so as to again move trimmer 10 if there is any difference in the signal in the two cases.

In employing this restandardization procedure, it is preferable to set up the original analysis procedure so that the trimmer which is not motor controlled is taken out of the beam of radiation as far as possible. This permits the motor driven trimmer to have the greatest possible range of control. In a more complicated form of the invention, a motor drive of the character described may be applied to both of the trimmers rather than just one of them. Again a single motor drive may be coupled to both trimmers so that one of the two is driven into one beam of radiation while the other trimmer is moved out of the second beam of radiation.

The invention may be readily adapted to fully automatic restandardization at selected time intervals. A master timing switch may be employed having contacts arranged to control the entire restandardization sequence. With this system, solenoid valves may be controlled by the timing switch to permit purging and filling of the cells of the apparatus as required.

It should be observed that this standardization procedure is dissimilar from those conventionally employed with infrared apparatus of this general character. Thus, for example, it is known that the balance of the bridge network illustrated in Figure 1 or the amplification of the associated amplifier may change with time, requiring restandarization of these components. This may necessitate rebalancing of the bridge network. However, this rebalancing is not equivalent to and does not fulfil the requirements of re-setting the light trimmers in the manner described. Actually, restandardization of the bridge network in this manner may be, and preferably is, conducted periodically in using the instrument described.

As described, therefore, this invention concerns a novel apparatus and method for periodically restandardizing a dual beam infrared analyzer. The basic analysis operation to which the invention has application requires that light intensity controls in one or both beams of radiation be maintained to critically control the relative radiation intensity of the two beams. Once this critical adjustment of the radiation intensity is established, this invention is employed to periodically check or reestablish the critical intensities of the two beams. This is simply carried out by coupling a reversible motor to at least one of the light intensity controls so as to permit moving this control into or out of the path of radiation, dependent on the direction of rotation of the motor and the voltage applied to the motor.

In order to develop a suitable voltage to drive the control motor as required, a particular sequence is followed. First, with the motor disconnected, nitrogen, or another gas which does not absorb infrared energy, is placed in the sample cell of the apparatus. The signal received by the energy detectors under this condition is employed as a reference voltage. Thereafter an infrared absorbing gas present in the composition being analyzed, other than the constituent to be determined, is placed in the sample cell. The voltage then developed by the detectors, to the extent this voltage is different from the reference voltage referred to, is used to drive the trimmer control motor. In other words the voltage to be used for this purpose is the differential voltage received by the detectors when the sample cell is filled with infrared absorbing gas and non-infrared absorbing gas. As indicated, this differential voltage is readily derived by connecting the trimmer drive motor in parallel with the drive motor of the recorder.

What is claimed is:

1. In a method for determining a specific constituent of a fluid mixture by infrared analysis in which a portion of said mixture is supplied to a sample cell therefor, dual beams of infrared radiation from a common source are passed simultaneously through said sample cell and the mixture portion therein along separate paths, in which one of said beams is then passed through a filter cell containing a relatively pure portion of said specific constituent while the other beam is passed through a compensator cell containing a portion of a fluid at least partially opaque to infrared radiation, said beams each impinging thereafter upon one of a pair of radiation sensitive detector elements connected in opposition to one another in an electrical circuit so as to produce a differential current therein in response to any variation of the intensity of said beams from a predetermined value therefor, and in which the intensity of said beams and the electrical balance of said circuit are adjusted initially to establish a predetermined null point, the additional steps which comprise periodically purging said sample cell of said fluid mixture, replacing said mixture with an infrared transparent fluid thereby to induce a first voltage signal in said electrical circuit, replacing said infrared transparent fluid in said sample cell with an infrared absorbing fluid other than said specific constituent to induce a second voltage signal in said electrical circuit and varying the intensity of at least one of said radiation beams in proportion to any differential voltage between said first and second signals, so as to erase said differential voltage and reestablish a null point balance in said electrical circuit.

2. A method according to claim 1, in which said infrared absorbing fluid replacing said infrared transparent fluid in said sample cell includes at least one of the non-specific constituents of said fluid mixture.

3. A method according to claim 1, in which said infrared absorbing fluid replacing said infrared transparent fluid in said sample cell includes a mixture of non-specific infrared absorbing constituents of said fluid mixture.

4. A method according to claim 1, in which said infrared absorbing fluid replacing said infrared transparent fluid in said sample cell, includes a constituent other than a constituent of said fluid mixture.

5. A method according to claim 4, in which said included constituent is a saturated paraffin gas.

6. A method according to claim 5, in which said saturated paraffin gas is propane.

7. A method according to claim 5, in which said saturated paraffin gas is butane.

References Cited in the file of this patent

UNITED STATES PATENTS

| | | |
|---|---|---|
| 2,269,674 | Liddell et al. | Jan. 13, 1942 |
| 2,350,001 | Van Den Aaker | May 30, 1944 |
| 2,439,373 | Stearns, Jr. | Apr. 6, 1948 |
| 2,525,445 | Canada | Oct. 10, 1950 |
| 2,545,162 | Muly et al. | Mar. 13, 1951 |